United States Patent
Cornelli

(10) Patent No.: US 9,414,616 B2
(45) Date of Patent: Aug. 16, 2016

(54) BAKERY PRODUCTS AND PASTA CAPABLE TO REDUCE BODY WEIGHT AND PLASMA CHOLESTEROL, LIPIDS AND GLUCOSE

(75) Inventor: Umberto Cornelli, Milan (IT)

(73) Assignee: COR. CON. INTERNATIONAL S.R.L., Parma (IT)

(*) Notice: Subject to any disclaimer, the term of this patent is extended or adjusted under 35 U.S.C. 154(b) by 909 days.

(21) Appl. No.: 12/465,514

(22) Filed: May 13, 2009

(65) Prior Publication Data

US 2009/0285922 A1 Nov. 19, 2009

(30) Foreign Application Priority Data

May 13, 2008 (IT) .............................. MI2008A0860

(51) Int. Cl.
*A61K 36/33* (2006.01)
*A23L 1/16* (2006.01)
*A21D 2/36* (2006.01)
*A23L 1/30* (2006.01)

(52) U.S. Cl.
CPC ... *A23L 1/16* (2013.01); *A21D 2/36* (2013.01); *A23L 1/3002* (2013.01); *A23V 2002/00* (2013.01)

(58) Field of Classification Search
CPC .............................. A61K 36/00; A61K 36/33
USPC ....................................................... 424/767
See application file for complete search history.

(56) References Cited

U.S. PATENT DOCUMENTS

2006/0228455 A1* 10/2006 Garza-Lopez et al. ....... 426/549

FOREIGN PATENT DOCUMENTS

| KR | 20020000734 A | * | 1/2002 |
| KR | 2002-0025937 | | 4/2002 |
| KR | 20020025937 A | * | 4/2002 |
| KR | 2002-0078888 | | 10/2002 |
| KR | 10-2004-0078928 | | 9/2004 |
| KR | 20060107217 A | * | 4/2005 |
| KR | 10-2005-0050197 | | 5/2005 |
| KR | 10-2006-0107217 | | 10/2006 |
| MX | 2004007801 A1 | * | 2/2006 |
| MX | 2005PA14183 | | 6/2007 |
| MX | 2005014183 A1 | * | 6/2007 |

OTHER PUBLICATIONS

Cargill: www.cargill.com/food/Na/En/products/lecithins/index.jsp.*
Normal saline drug: "www.medicinenet.com".*
Anonymous: "Nopal" [Online] 2007, 1-11 XP002539665 Retrieved from the Internet: URL:http://www.passeportsante.net/fr/Solutions/PlantesSupplements/Fiche.aspx?doc=nop al-ps> [retrieved on Jul. 29, 2009].
Anonymous: "Nopal Recipes" [Online] Mar. 20, 2007, P002539663 Retrieved from the Internet: URL:http://www.nopalmx.com/recipes.htm> [retrieved on Jul. 29, 2009].
Anonymous: "The world's best powdered nopal" [Online] Mar. 20, 2007, XP002539662 Retrieved from the Internet: URL:http://www.nopalmx.com/> [retrieved on Jul. 29, 2009].
Carmen, Saenz H. 1996 "Food products from cladodes and cactus pears." Journal of the Professional Association for Cactus Development, pp. 89-97. [Online] XP002539664 Chile. Retrieved from the Internet: URL:http://www.jpacd.org/V1-1996/V1-1996/0 14V1P%2089-97.pdf> [retrieved on Jul. 31, 2009].
Choi, J., et al. 2002 "Biological activities of the extracts from fruit and stem of prickly pear (*Opuntia ficus-indica* var. *saboten*) III.—Effects on subacute alcoholic hyperlipidemia in rats" *Korean Journal of Pharmacology* 33(3):238-244. English Abstract only.
Rodriguéz-Terrazas B.J et al. "Addition of nopal (*Opuntia* sp.) to bread as a source of fiber." "2002 Annual Meeting and Food Expo, [Online] Jun. 16, 2002, XP002539661 California Retrieved" from the Internet: URL: http://ift.confex.com/ift/2002/techprogram/paper_12651.htm> retrieved on Jul. 29, 2009 abstract.
Shin, J. et al. 2003 "Hypoglycemic activity of *Opuntia ficus-indica* var. *sabot* on alloxan-or streptolotocin-induced diabetic mice" *Korean Journal of Pharmacology* 34(1):75-79.
Stintzing, F. C. et al. 2005 "Cactus stems (*Opuntia* spp.): A review on their chemistry, technology and uses" *Mol. Nutr. Food Res* 49:175-194.
European Search Report for European Application No. EP 09159998, dated Oct. 9, 2009.
Bray, G.A. 1998 in *Harrison's Principles of Internal Medicine* (14th edition, vol. 1), Section 75 "Obesity" Fauci et al. eds. McGraw Hill, pp. 454-462.
Cornelli, U. et al. 2006 "The Use of Polyglucosamine in the Metabolic Syndrome Control" *La Medicina Biologica* (October-December): pp. 45-54.
Grundy, S.M. et al. 2001 "Executive Summary of the Third Report of the National Cholesterol Education Program (NCEP) Expert Panel on Detection, Evaluation, and Treatment of High Blood Cholesterol in Adults (Adult Treatment Panel III)" *JAMA* 285(19):2486-2497.
Grundy, S.M. et al. 2002 "Third Report of the National Cholesterol Education Program (NCEP) Expert Panel on Detection, Evaluation, and Treatment of High Blood Cholesterol in Adults (Adult Treatment Panel III) Final Report" *Circulation Journal of the American Heart Association* 106:3143-3181 and 3373-3377.
Tierny, L.M. Jr. et al. 2004 in *Current Medical Diagnosis & Treatment* "Obesity, Essentials of Diagnosis" pp. 1215-1218.
Willett, W.C. et al. 1999 "Guidelines for Healthy Weight" *The New England Journal of Medicine* 341(6):427-434.
Whitney, M.T., Feb. 20, 2007 "Nopal plant normalizes blood sugar, treats diabetes, boosts insulin sensitivity", Natural News.com. Downloaded from the internet at http://www.naturalnews.com/021626.html on May 13, 2009.
Fuegang, J.M. et al. 2006 "Nutritional and medicinal use of cactus pear (*Opuntia* spp.) cladodes and fruits" *Frontiers in Bioscience* 11:2574-2589.

(Continued)

*Primary Examiner* — Chris R Tate
*Assistant Examiner* — Deborah Davis
(74) *Attorney, Agent, or Firm* — Knobbe, Martens, Olson & Bear, LLP

(57) ABSTRACT

The present invention relates to flour-based food products containing Nopal (Opuntia ficus-indica) capable to reduce body weight and plasma LDL cholesterol, lipids and glucose.

5 Claims, No Drawings

(56) References Cited

OTHER PUBLICATIONS

Lee, Y.-C. et al. 2005 "Food functionality of *Opuntia ficus-induca* var. cultivated in Jeju Island" *J Food Sci Nutr* 10:103-110.

Lopez, J.L. 2007 "Use of Opuntia Cactus as a Hypoglycemic Agent in Managing Type 2 Diabetes Mellitus among Mexican American Patients" *Nutrition Bytes* 12(1): 1-6.

Medrano-Galarza, M.T. et al. 2003 "Development of a high dietetic fiber breakfast cereal using oats, wheat bran and dried cactus leaves of nopal as ingredients" Institute of Food Technologists Annual Meeting, Chicago, Abstract No. 14F-13.

Rodriguez-Terazas, B.J. et al. 2002 "Addition of nopal (*Opuntia* sp.) to bread as a source of fiber" Annual Meeting and Food Expo, Anaheim, CA, Abstract No. 15F-17.

Saenz, C. et al. 2006 "Using Agro cactus" Agricultural Services Bulletin 162 FAO Organization of the United Nations Food and Agriculture (Rome).

Third Party Observation for corresponding European Patent Application Publication No. EP2127527.

Wilson, M. 2007 in *Medicinal Plant Fact Sheet: Opuntia: Prickly pear cactus*, pp. 1-12.

\* cited by examiner

BAKERY PRODUCTS AND PASTA CAPABLE TO REDUCE BODY WEIGHT AND PLASMA CHOLESTEROL, LIPIDS AND GLUCOSE

CROSS-REFERENCE TO RELATED APPLICATIONS

This application claims the benefit of Italian Patent Application No. MI2008A000860, filed May 13, 2008, incorporated herein by reference.

BACKGROUND OF THE INVENTION

1. Field of the Invention

The present invention relates to flour-based food products capable to reduce body weight and plasma lipids, LDL cholesterol and glucose.

2. Description of the Related Art

Overweight is usually linked to an increase in total body weight with obesity being its extreme manifestation. It is a social problem whose prevalence in industrialized nations is on the increase and which predisposes to pathologies such as diabetes mellitus, hypertension, cardiopathy, gall bladder diseases and a few neoplastic forms. The National Health and Nutrition Exam Survey In has estimated that, in industrialized nations, 59.4% of men and 49.9% of women are overweight and 19.9% of men and 25.1% of women are obese [National Cholesterol Education Program, Third Report NIH Publication No. 01-3760 May 2001].

The term "obesity" is frequently erroneously used as a synonym for "overweight". Accurate and expensive methods exist for measuring total body weight such as dual-energy X-ray densitometry, nuclear magnetic resonance, computerized axial tomography, but the most used method, characterised by accuracy and reliability, is the measurement of weight and height. The most widely used formula for relating height to weight is the body mass index (BMI) given by the weight/height ratio in which weight is expressed in kilograms and height in metres. A BMI between. 18.5 and 24.9 kg/m$^2$ is considered normal for most people. A person of 70 kg weight and 1.70 m height has a BMI of $70/1.70^2$=24.2 kg/m$^2$. Overweight is defined as a BMI of between 25 and 29.9 kg/m$^2$. Obesity is divided into three classes: class I with a BMI of between 30 and 34.9 kg/m$^2$, class II with a BMI of between 35 and 39 kg/m$^2$ and class III with a BMI>40 kg/m$^2$.

Body fat and its distribution are affected by the amount of calories (energy) ingested, gender, age, level of physical activity, chronic use of a number of drugs and various pathologies. The dietary component is certainly the main cause of increased BMI. If, through the diet, energy needs are continuously exceeded due to incorrect dietary habits, an increased BMI is unavoidable, although the extent of increase depends on the individual. In both sexes body fat increases with age and, after puberty, women have a greater amount of adipose tissue at the same age. Energy needs are linked to activity, therefore sedentariness can be considered as another basic factor in causing overweight.

Although these two mentioned factors, namely caloric intake and sedentariness, are undoubtedly the main causes responsible for this problem, in many individuals a strong influence of genetic factors has been observed, which can increase the predisposition to the problem development until the establishment of obesity. Five syndromes with early childhood onset are described (Prader Willi, Ahlstrom, Laurence-Moon-Biedl, Cohen and Carpenter syndromes), wherein a genetic contribution is critical to the onset of obesity [Harrison, Principals of Internal Medicine. 14° edition. Vol. 1: 525-534; L M Tierney, S J McPhee, M A Papadakis. Current Medical Diagnosis & Treatment 2004, p.1215-1217].

Less than 1% of obese patients have endocrine pathologies responsible for obesity, such as Cushing's disease, polycystic ovary syndrome, hypothyroidism, post-trauma or iatrogenic hypothalamic damage and destructive lesions in the ventromedial and paraventricular nuclei, or take drugs which promote obesity (e.g. phenothiazine, anti-depressants, anti-epileptics and anti-hypertensives).

Weight gain can lead to an increase in health risks even if the BMI does not exceed 25 kg/m$^2$; in women a weight gain of over 5 kg is associated with an increased risk of diabetes and cardiopathy and in men any weight gain after the age of 25 involves a health risk (W C Willet, W H Dietz, G A Colditz. Primary care: guidelines for healthy weight. NEJM 1999; 341: 427-434).

Deposition of fat in the upper body is associated with greater health risks compared to deposition of fat in lower regions. The risks associated with overweight are: diseases of the cardiovascular system (increased workload, atherosclerosis, increased risk of sudden death and increased prevalence of hypertension), diabetes mellitus (type 2 diabetes mellitus is practically non-existent in subjects with a BMI<22 kg/m$^2$), neoplasias (tumours, whose incidence has been observed to increase in obese patients are mammary and endometrial carcinoma in post-menopausal women, prostate carcinoma in men and colorectal cancer in both sexes), gall bladder diseases (calculosis of the gall bladder is related to increased cholesterol production in obese patients), alteration of pulmonary function (increased sleep apnoea risk), joint and skin disorders (osteoarthritis, gout, acanthosis nigricans, increased skin turgidity and fragility and susceptibility to mycosis), pathologies of the endocrine system (insulin resistance, early menarche, irregular and anovular cycles, early menopause).

The most effective therapeutic programme consists of a multidisciplinary approach with a low calorie diet, behaviour modifications, aerobic physical exercise and psychological support.

In industrialized nations, cardiovascular diseases are the cause of about 30% of deaths. Over 85% of the latter occur in the over 65 aged population with the remaining 15% occurring at an earlier age, often following the first episode (in 80% of cases). These epidemiological factors indicate that, in order to face the problem in an effective manner, it is essential the possibility to identify the risk factors.

The major risk factors have been identified and are as follows:

An increase in LDL cholesterol (LDL-C); a reduction in HDL cholesterol (HDL-C); cigarette smoke; hypertension; type 2 diabetes; obesity; premature death of a first degree relative (man<55 years; woman<65 years).

The control of modifiable risk factors therefore becomes essential for accurate prevention. Observational studies have shown that such modifiable factors are responsible for about 85% of total risk and their removal would hence result in a substantial disease reduction.

Cholesterol is particularly important as a risk factor, in that lowering levels to less than 160 mg/dL is established as being sufficient to substantially cut down cardiovascular mortality even in the presence of other risk factors.

On the other hand all elements leading to high cholesterol levels are to be considered as risk factors. One of these is dietary saturated fatty acids (animal fats) which increase blood cholesterol and therefore their intake should be limited.

In general, the recommendations (NCEPT: National Cholesterol Education Program) entail reducing lipid intake to averagely less than 30% of total daily calories and, among these lipids, only less than a third (hence, less than 10% of total daily calories) should be saturated (i.e. of animal origin). Another alternative method of facing the problem is to keep lipid levels under control by adjusting them naturally (with food or fibre) so as to achieve levels with reduced risk as given in Table 1 (Goodman & Gilman. The pharmacological basis of therapeutics: eleventh edition: 933-945.)

TABLE 1

Classification of plasma lipid levels according to NCEPT guidelines

Total cholesterol

| | |
|---|---|
| <200 mg/dL | Desirable |
| 200-239 mg/dL | Moderately raised |
| ≥240 mg/dL | High |

HDL-C

| | |
|---|---|
| <40 mg/dL man; <50 mg/dL woman | Low |
| >60 mg/dL | High |

LDL-C (LDL cholesterol)

| | |
|---|---|
| <129 mg/dL | Optimal/good |
| 130-189 mg/dL | High |
| >190 | Very high |

Triglycerides

| | |
|---|---|
| <150 mg/dL | Normal |
| 150-199 mg/dL | Normal/high |
| 200-499 mg/dL | High |
| ≥500 mg/dL | Very high |

The evaluation of plasma lipid levels shall be carried out after at least 12 hours of fasting. LDL-C measurement is calculated using the formula:

$$LDL\text{-}C = (total\ cholesterol - (triglycerides: 5) - HDL\text{-}C).$$

The first therapy target should be connected to healthy eating recommendations and to activity (lifestyle changes). If such provisions do not result in the desired effects, an actual therapy should be initiated.

The following Table 2 proposes the suggestions adopted by NCEPT.

TABLE 2

LDL-C levels at which to take measures by changing lifestyle or by undergoing therapy

| | LDL-C levels |
|---|---|
| Lifestyle changes | |
| Patient without coronary heart disease with 0 or 1 risk factor | >160 |
| Patient without coronary heart disease with 2 risk factors | >130 |
| Patient with coronary heart disease or equivalent cardiovascular disorder* | >100 |
| Therapy | |
| Patient without coronary heart disease with 0 or 1 risk factor | ≥190 |
| Patient without coronary heart disease and 2 or more risk factors and a 10-year risk of <10% | ≥160 |
| Patient without coronary heart disease and 2 or more risk factors and a 10-year risk between 10 and 20% | ≥130 |
| Patient with coronary heart disease or equivalent cardiovascular disorder* | ≥100** |

*equivalent cardiovascular disorder = peripheral arteriopathy, abdominal aortic aneurysm, symptomatic carotid stenosis, 10-year risk >20% ("10-year risk" means the risk of having coronary heart disease within 10 years; it is calculated as a percentage).
**some authors consider starting therapy only when the LDL-C level is ≥130 mg/dL.

The summation of points relating to various risk factors represents the percentage of patients that, further to thorough epidemiological studies, have had a coronary episode (ischemic-infarct) within 10 years following their assessment [National Cholesterol Education Program. Third Report NIH Publication No 01-3760 May 2001].

The essential point for a therapeutic/corrective intervention on overweight, other than cholesterol and triglyceride levels, is the diet: the main object is a reduction in fat intake (a reasonable diet is one with less than 25% of calories deriving from fats) and the introduction of fibres. It has been found to be very useful the exclusion of alcoholic drinks and foods having high calorie content but few nutrients, and the increase of the meal frequency, while reducing amount concerned and increasing the complex carbohydrate and fibre content thereof.

In the daily life, there are situations where the fat intake can be difficult to control, mainly because fats increase food palatability. Therefore, a drastic reduction in fat content, cholesterol included, can be found not to have an appreciable gastronomic value. This limitation results in a tendency to go on a diet for limited periods of time, thus running the known risk of quickly regaining the weight at the end of such periods (yo-yo effect).

Therefore, the research attempts have turned towards the introduction of fibres or phytosterols in frequently consumed foods, such as pasta and bread, in order to limit the fat and cholesterol absorption. In this way, while still continuing to eat the same types of foods, fat absorption is reduced with consequent reduction of plasma lipid levels (cholesterol and triglycerides) and body weight.

It is therefore an object of the present invention to provide foods that can be frequently consumed, while being at the same time capable of limiting the fat absorption in order to comply with a balanced and healthful diet requirements.

SUMMARY OF THE INVENTION

The above object has been achieved by food products, such as bakery products and pasta, comprising Opuntia ficus-indica, also called "Nopal", that make them capable to reduce body weight and plasma LDL cholesterol, lipids and glucose, without affecting the palatability and without losing their beneficial properties during baking or boiling.

In the present invention, the terms "Opuntia ficus-indica" or "Nopal" are meant to include the extract and/or powder of said plant and/or its fruits and/or its cladodes.

DETAILED DESCRIPTION OF THE PREFERRED EMBODIMENT

The present invention therefore relates to food products comprising flour and Opuntia ficus-indica.

The pads, or cladodes, as well as the fruit of the Opuntia ficus-indica, contain a series of substances, such as polyphenols, (quercetin, taxifolin, kaempferol, etc.), other phenolic constituents (opuntioside, opunthiol), phytosterols (β-sitosterols, etc), organic acids (malic, citric, malonic, succinic, etc.), amino acids (alanine, glutamine, phenylalanine, glycine, etc.), fatty acids (omega-3 and omega-9), vitamins and carotenoids, as well as compounds of polymeric nature (cellulose, hemicelluloses, lignin).

Preferably, the food products of the present invention comprises Nopal in the form of powder.

The term "flour" in the present invention refers to flour of any type of cereal, i.e. wheat, maize, oats, barley, emmer wheat and legume flours and mixtures thereof. Preferably wheat flour, either wholemeal or not, is employed.

For the purposes of the present invention, the expression "bakery products" refers to yeast-risen and non yeast-risen products, such as bread, Danish toasts, crackers, biscuits. Preferably, a food product according to the present invention is bread.

For the purposes of the present invention, the term "pasta" refers to any shape and type of fresh or dried pasta to be cooked by boiling in water, suitable for pasta dishes or broth-based soups or for ravioli, tortellini, cappelletti, etc, optionally containing fresh or freeze-dried eggs.

Remarkable results, in terms of reducing the aforesaid parameters, are obtained by administering the food products according to the present invention in a daily dose of Nopal of 2 to 6 g/day.

Preferably, the food products of the present invention comprise 0.5 wt % to 6 wt % of Nopal on the basis of the flour weight, more preferably, 1 wt % to 3 wt % of Nopal on the basis of the flour weight. As it will be apparent for the Examples given below, these weight ratios have been found to be surprisingly very effective in reducing body weight and plasma LDL cholesterol, lipids and glucose, while the palatability has resulted unchanged with respect to the comparative food products without Nopal; additionally, the beneficial properties of Nopal have been found to remain surprisingly unaltered after baking or boiling.

In a further aspect, the present invention concerns powdered mixtures suitable for dough, in particular for bread dough, comprising flour and 0.5 wt % to 6 wt % of Nopal on the basis of the flour weight, more preferably, 1 wt % to 3 wt % of Nopal on the basis of the flour weight.

In a preferred embodiment, the powdered mixtures comprise 0.5 wt % to 6 wt % of Nopal, 4.5 wt % to 5.5 wt % of brewer's yeast, 0.8 wt % to 1 wt % of a sugar, such as sucrose, 0.8 wt % to 1 wt % of sodium chloride, on the basis of the flour weight.

In a further aspect, the present invention concerns a dough for the preparation of the food products according to the present invention comprising said powdered mixtures and sufficient water to enable dough to be formed and handled.

In a preferred embodiment, this dough further comprises 2 to 6 fresh whole eggs, so that egg pasta can be prepared, particularly hand crafted pasta.

The following Examples of the present invention are provided by way of non-limiting illustration of the bakery products in particular bread and pasta, particularly fresh pasta and egg pasta according to the present invention, as well as tests for evaluating weight reduction activity, and plasma lipid, LDL cholesterol and glucose reduction activity, achieved by said food products.

In particular, for preparing the food products reported in the Examples below, Nopal (Opuntia ficus-indica), having preferably the following characteristics, has been used:

| Nopal (Opuntia ficus-indica) | Feature description |
| --- | --- |
| Physical Characteristics | |
| Appearance | light green powder |
| Odour | characteristic |
| Moisture content | <10% |
| Density | <0.25 g/ml |
| Powders | <27% |

-continued

| Nopal (Opuntia ficus-indica) | Feature description |
| --- | --- |
| Nutritional Analysis | |
| Fibre | >33% |
| Cellulose and hemicellulose | >14% |
| Proteins | <10% |
| Carbohydrates | by difference from above |

EXAMPLE 1

Preparation of Bread Containing Nopal

Nopal having the aforesaid characteristics was used in the preparation of a bakery product (bread) of the following composition:

To a mixture consisting of the following components:
Whole meal flour 500 g
Nopal 10 g
Brewer's yeast 25 g
Sucrose 5 g
Sodium chloride 5 g
Water at a temperature of 35° C. was added in an amount of 250 ml.

After dough preparation, the product was left to rise for 2 hours at a temperature of 25° C. then oven baked at a temperature of 180° C. for a period of 30 minutes.

The bakery product (bread) was used as a food within a 5 day period from its production.

EXAMPLE 2

Preparation of Tagliatelle Containing Nopal

Nopal having the aforesaid characteristics was used for the preparation of pasta in the form of tagliatelle as follows:
A dough was prepared with the following components:
flour "type 00" 500 g
Nopal 10 g
5 whole eggs
20 ml of water
The dough was mixed for 10 minutes then rolled out to obtain a thin sheet of a thickness between 0.5 and 1 mm.

The sheet was then cut into strips (tagliatelle) between 0.2 and 0.4 cm wide which were maintained at room temperature for a period of 6 hours. The tagliatelle were used for periods up to 30 days after their production by boiling in salted water according to the usual pasta cooking methods, i.e. in water with a variable amount of salt added when the water boiled. The tagliatelle were always boiled for 10±2 minutes. Condiments of various types were added thereto depending on the dietary habits of the various subjects analyzed.

EXAMPLE 3

Evaluation of the Effectiveness of the Food Products According to the Present Invention General Procedure Adopted
The individuals to be treated with the food products were enrolled according to the following criteria:
Subjects of both sexes, aged between 30 and 65 years and having a body mass index (BMI)>25.

Alcoholic patients or those affected by chronic illnesses who were not under sufficient therapeutic control or those affected by oncologic pathologies were not admitted.

The treatments with bread or pasta comprising Nopal according to the present invention or ordinary bread or pasta were assigned according to a randomized list and were continued for a period of 15 days.

Diets were maintained constant and the individuals had to record daily food portions onto a relevant questionnaire according to the following categories: vegetables, fruit, cereals (to also include potatoes), sugared drinks, legumes, meat (including sausages), dairy products, eggs, alcoholic drinks (as alcohol units, considering that 1 unit of alcohol corresponds to 125 ml of wine, 330 ml of beer and 40 ml of spirits). Each single portion was then identified by size (small, large, medium) in order to calculate the energy equivalents.

This questionnaire is in use at SENB, i.e. European Society of Biological Nutrition (Comelli U., Milani L., Perra A., The use of polyglucosamine to control Metabolic Syndrome, La Medicina Biologica 2006; 4: 45-54).

The individuals were advised to maintain their normal physical activity which, for all the individuals under study, was considered to be of sedentary type; none of the individuals pursued particular types of physical training.

Any undergoing therapies were continued.

All the individuals were assessed in the morning between 9 and 10 am after fasting for at least 12 hours. Blood was collected from the brachial vein into heparinized tubes; the collection was carried out in two aliquots each of 5 ml and the laboratory evaluations were conducted within 2 hours from collection. All laboratory evaluations were conducted in the same analytical laboratory.

Anthropometric evaluations (weight, abdominal circumference, body mass index (BMI)) were undertaken before blood collection.

Each one of the selected individuals was supplied with bread and pasta for a 5 day period (400 g of pasta and 500 g of bread) in identical containers, the appearance of the bread and pasta containing Nopal being similar to ordinary bread and pasta.

All the foods were produced by the same manufacturer. In cases where individuals were used to eat larger daily amounts of bread and pasta, they could provide themselves with the exceeding amounts from their usual shops. As the individuals were supplied with food for only 5 days, it was possible to obtain information on tolerability and palatability of the food.

All the individuals were asked for their informed consent after careful explanation of the reasons for the research.

All 30 enrolled individuals completed the research and no side effects were ever observed neither were there reported complaints regarding palatability of foods containing Nopal according to the present invention.

The means and standard deviations (SD) of the data were calculated. The differences between before and after treatment were evaluated on the basis of the Student t-test for interdependent data.

In order to determine any effects differentiated between pasta and bread containing Nopal, the differences before and after treatment were evaluated by the analysis of variance for orthogonal contrasts.

Evaluation of the Activity of Pasta Containing Nopal According to the Present Invention In order to evaluate the activity of pasta (tagliatelle), 10 individuals of both sexes with a BMI>25 and aged between 33 and 57 years were selected. Any ongoing therapies were continued. Body weight, abdominal circumference, cholesterol, triglyceride and glycemia levels were measured in all individuals before the treatment with tagliatelle prepared according to Example 2 and 15 days after consuming the following amounts:

80 g/day of tagliatelle in one or two meals. The total quantity of Nopal administered in the 15 days period was 24 g (1.6×15).

The results are given in following Tables 3 and 4.

TABLE 3

Individual values before treatment with tagliatelle containing Nopal

| Individual | Age | Sex (M/F) | Weight (kg) | BMI (Kg/m$^2$) | AC (cm) | Total cholesterol (mg/dL) | LDL cholesterol (mg/dL) | HDL cholesterol (mg/dL) | Triglycerides (mg/dL) | Glycemia (mg/dL) |
|---|---|---|---|---|---|---|---|---|---|---|
| 1 | 44 | F | 87.0 | 27.5 | 101 | 200 | 109 | 47 | 220 | 110 |
| 6 | 42 | F | 79.0 | 28.3 | 89 | 215 | 127 | 44 | 218 | 98 |
| 8 | 39 | M | 81.2 | 29.5 | 90 | 213 | 133 | 41 | 195 | 95 |
| 12 | 33 | F | 90.6 | 26.5 | 103 | 201 | 119 | 47 | 175 | 115 |
| 15 | 45 | M | 92.2 | 27.5 | 106 | 199 | 121 | 44 | 170 | 100 |
| 21 | 57 | F | 70.3 | 26.1 | 87 | 190 | 103 | 50 | 185 | 89 |
| 25 | 55 | F | 71.9 | 26.4 | 87 | 220 | 131 | 49 | 200 | 100 |
| 26 | 45 | M | 68.7 | 26.5 | 87 | 207 | 106 | 55 | 230 | 105 |
| 27 | 41 | F | 68.9 | 26.9 | 86 | 195 | 100 | 55 | 200 | 97 |
| 29 | 39 | M | 83.1 | 25.9 | 103 | 188 | 96 | 58 | 170 | 91 |
| Mean | 44 | | 79.3 | 27.1 | 93.9 | 202.8 | 114.5 | 49.0 | 196.3 | 100.0 |
| SD | 7.3 | | 8.99 | 1.10 | 8.21 | 10.73 | 13.46 | 5.54 | 210.51 | 8.10 |

AC = abdominal circumference;
SD = standard deviation

TABLE 4

Individual values after treatment with tagliatelle containing Nopal

| Individual | Age | Sex (M/F) | Weight (kg) | BMI (Kg/m$^2$) | AC (cm) | Total cholesterol (mg/dL) | LDL cholesterol (mg/dL) | HDL cholesterol (mg/dL) | Triglycerides (mg/dL) | Glycemia (mg/dL) |
|---|---|---|---|---|---|---|---|---|---|---|
| 1 | 44 | F | 85.2 | 26.92 | 99 | 180 | 96 | 46 | 190 | 103 |
| 6 | 42 | F | 77.1 | 27.6 | 86 | 180 | 99 | 41 | 200 | 98 |
| 8 | 39 | M | 79.2 | 28.7 | 86 | 195 | 125 | 38 | 160 | 90 |
| 12 | 33 | F | 88.6 | 25.9 | 98 | 180 | 110 | 40 | 150 | 105 |
| 15 | 45 | M | 90.5 | 27.0 | 102 | 160 | 86 | 41 | 165 | 95 |
| 21 | 57 | F | 68.1 | 25.3 | 84 | 150 | 74 | 46 | 150 | 90 |
| 25 | 55 | F | 69.4 | 25.5 | 84 | 175 | 92 | 47 | 182 | 90 |
| 26 | 45 | M | 66.8 | 25.8 | 84 | 178 | 90 | 50 | 192 | 100 |
| 27 | 41 | F | 66.6 | 26.0 | 83 | 180 | 79 | 62 | 195 | 91 |
| 29 | 39 | M | 80.2 | 25.0 | 100 | 160 | 68 | 60 | 160 | 88 |
| Mean | 44 | | 77.2 | 26.4 | 90.6 | 173.8 | 91.8 | 47.1 | 174.4 | 95 |
| SD | 7.3 | | 9.12 | 1.17 | 7.99 | 13.21 | 16.96 | 8.21 | 19.39 | 6.13 |

AC = abdominal circumference;
SD = standard deviation

The differences between before and after treatment are statistically significant (p<0.05) using the Student t-test for interdependent values, for: body weight (decrease), BMI (decrease), total cholesterol (decrease), LDL cholesterol (decrease), HDL cholesterol (increase), triglycerides (decrease) and glucose (decrease).

Evaluation of the Activity of Bread Containing Nopal According to the Present Invention In order to evaluate the activity of bread, 10 individuals of both sexes having a BMI>25 and aged between 33 and 58 years were selected. Any undergoing therapies were continued. Body weight, abdominal circumference, cholesterol, triglyceride and glycemia levels were measured in all individuals before using the bread prepared according to Example 1 and 15 days after consuming 100 g/day every day during meals. The total amount of Nopal administered in the 15 day period was 30 g [2×15]. The results are given in the following Tables 5 and 6.

TABLE 5

Individual values before treatment with bread containing Nopal

| Individual | Age | Sex (M/F) | Weight (kg) | BMI (Kg/m$^2$) | AC (cm) | Total cholesterol (mg/dL) | LDL cholesterol (mg/dL) | HDL cholesterol (mg/dL) | Triglycerides (mg/dL) | Glycemia (mg/dL) |
|---|---|---|---|---|---|---|---|---|---|---|
| 2 | 55 | F | 89.3 | 27.6 | 101 | 212 | 113 | 62 | 185 | 95 |
| 7 | 38 | F | 77.1 | 26.7 | 86 | 205 | 106 | 59 | 202 | 97 |
| 9 | 44 | M | 88.1 | 27.8 | 102 | 211 | 108 | 65 | 190 | 97 |
| 13 | 42 | M | 69.4 | 28.2 | 89 | 230 | 125 | 61 | 220 | 92 |
| 16 | 39 | F | 69.4 | 26.1 | 85 | 190 | 109 | 35 | 230 | 105 |
| 19 | 33 | F | 83.4 | 29.2 | 100 | 204 | 129 | 37 | 188 | 105 |
| 20 | 33 | M | 78.2 | 27.1 | 85 | 207 | 125 | 41 | 204 | 94 |
| 22 | 42 | M | 95.2 | 29.1 | 106 | 210 | 135 | 37 | 189 | 87 |
| 24 | 58 | F | 80.5 | 26.0 | 100 | 190 | 116 | 39 | 177 | 92 |
| 30 | 50 | F | 75.7 | 26.8 | 92 | 200 | 105 | 62 | 165 | 94 |
| Mean | 43 | | 80.6 | 27.4 | 94.6 | 205.9 | 117.1 | 49.8 | 195.0 | 95.8 |
| SD | 8.6 | | 8.47 | 1.12 | 8.03 | 11.58 | 10.82 | 12.82 | 19.48 | 5.63 |

AC = abdominal circumference;
SD = standard deviation

TABLE 6

Individual values after treatment with bread containing Nopal

| Individual | Age | Sex (M/F) | Weight (kg) | BMI (Kg/m$^2$) | AC (cm) | Total cholesterol (mg/dL) | LDL cholesterol (mg/dL) | HDL cholesterol (mg/dL) | Triglycerides (mg/dL) | Glycemia (mg/dL) |
|---|---|---|---|---|---|---|---|---|---|---|
| 2 | 55 | F | 86.1 | 26.6 | 97 | 165 | 72 | 63 | 150 | 90 |
| 7 | 38 | F | 74.3 | 25.7 | 83 | 170 | 77 | 64 | 145 | 88 |
| 9 | 44 | M | 85.1 | 26.9 | 97 | 169 | 71 | 66 | 160 | 90 |
| 13 | 42 | M | 67.0 | 27.2 | 86 | 177 | 76 | 63 | 190 | 91 |
| 16 | 39 | F | 67.2 | 25.3 | 82 | 160 | 79 | 43 | 192 | 90 |
| 19 | 33 | F | 80.7 | 28.3 | 96 | 172 | 95 | 46 | 155 | 95 |
| 20 | 33 | M | 75.3 | 26.1 | 80 | 160 | 84 | 44 | 160 | 74 |
| 22 | 42 | M | 92.8 | 28.3 | 100 | 185 | 112 | 40 | 165 | 81 |
| 24 | 58 | F | 78.3 | 25.3 | 95 | 155 | 87 | 41 | 135 | 90 |
| 30 | 50 | F | 72.8 | 25.8 | 87 | 158 | 65 | 67 | 131 | 87 |

TABLE 6-continued

Individual values after treatment with bread containing Nopal

| Individual | Age | Sex (M/F) | Weight (kg) | BMI (Kg/m$^2$) | AC (cm) | Total cholesterol (mg/dL) | LDL cholesterol (mg/dL) | HDL cholesterol (mg/dL) | Triglycerides (mg/dL) | Glycemia (mg/dL) |
|---|---|---|---|---|---|---|---|---|---|---|
| Mean | 43 | | 78.0 | 26.5 | 26.5 | 167.1 | 81.7 | 53.7 | 81.7 | 87.6 |
| SD | 8.6 | | 8.35 | 1.12 | 1.12 | 9.36 | 13.69 | 11.66 | 13.69 | 5.95 |

AC = abdominal circumference;
SD = standard deviation

The differences between before and after treatment are statistically significant (p<0.05) using the Student t-test for interdependent values, for: body weight (decrease), BMI (decrease), abdominal circumference (decrease), total cholesterol (decrease), LDL cholesterol (decrease), HDL cholesterol (increase), triglycerides (decrease) and glucose (decrease).

Evaluation of Ordinary Bread and Pasta

In order to evaluate the activity of ordinary bread, 10 individuals of both sexes having a BMI>25 and aged between 32 and 60 years were selected. Any undergoing therapies were continued. Body weight, abdominal circumference, cholesterol, triglyceride and glycemia levels were measured in all individuals before using ordinary bread and pasta and 15 days after consuming them as follows: 100 g/day of ordinary bread/pasta every day for 15 days, split into the two main daily meals. The results are given in the following Tables 7 and 8.

TABLE 7

Individual values before treatment with ordinary bread/pasta

| Individual | Age | Sex (M/F) | Weight (kg) | BMI (Kg/m$^2$) | AC (cm) | Total cholesterol (mg/dL) | LDL cholesterol (mg/dL) | HDL cholesterol (mg/dL) | Triglycerides (mg/dL) | Glycemia (mg/dL) |
|---|---|---|---|---|---|---|---|---|---|---|
| 3 | 47 | F | 87.1 | 28.4 | 102 | 220 | 119 | 66 | 180 | 111 |
| 4 | 37 | M | 77.3 | 29.5 | 87 | 235 | 154 | 39 | 212 | 93 |
| 5 | 55 | F | 75.4 | 27.7 | 86 | 190 | 97 | 41 | 257 | 87 |
| 10 | 53 | M | 70.1 | 28.1 | 88 | 185 | 91 | 48 | 221 | 88 |
| 11 | 32 | F | 70.7 | 25.4 | 87 | 191 | 94 | 54 | 218 | 89 |
| 14 | 60 | M | 79.9 | 25.5 | 100 | 203 | 113 | 53 | 179 | 95 |
| 17 | 39 | F | 84.0 | 27.1 | 99 | 212 | 119 | 59 | 177 | 90 |
| 18 | 37 | F | 80.1 | 28.4 | 85 | 235 | 148 | 47 | 190 | 90 |
| 23 | 40 | F | 87.7 | 26.8 | 103 | 215 | 121 | 39 | 266 | 89 |
| 28 | 45 | M | 91.5 | 26.7 | 105 | 208 | 91 | 52 | 317 | 103 |
| Mean | | | 80.4 | 27.4 | 94.2 | 209.4 | 114.7 | 49.8 | 221.7 | 93.5 |
| SD | | | 7.22 | 1.31 | 8.20 | 17.68 | 22.6 | 8.83 | 45.90 | 7.72 |

AC = abdominal circumference;
SD = standard deviation

TABLE 8

Individual values after treatment with ordinary bread/pasta

| Individual | Age | Sex (M/F) | Weight (kg) | BMI (Kg/m$^2$) | AC (cm) | Total cholesterol (mg/dL) | LDL cholesterol (mg/dL) | HDL cholesterol (mg/dL) | Triglycerides (mg/dL) | Glycemia (mg/dL) |
|---|---|---|---|---|---|---|---|---|---|---|
| 3 | 47 | F | 87.3 | 28.5 | 100 | 225 | 125 | 60 | 191 | 112 |
| 4 | 37 | M | 77.5 | 29.5 | 86 | 233 | 150 | 37 | 231 | 93 |
| 5 | 55 | F | 74.2 | 27.3 | 87 | 200 | 99 | 45 | 273 | 90 |
| 10 | 53 | M | 70.1 | 28.1 | 88 | 183 | 99 | 50 | 215 | 91 |
| 11 | 32 | F | 70.5 | 25.3 | 88 | 190 | 98 | 50 | 211 | 87 |
| 14 | 60 | M | 78.9 | 25.2 | 100 | 209 | 125 | 46 | 184 | 96 |
| 17 | 39 | F | 83.9 | 27.1 | 99 | 206 | 108 | 61 | 187 | 94 |
| 18 | 37 | F | 78.4 | 27.8 | 85 | 242 | 154 | 49 | 190 | 88 |
| 23 | 40 | F | 87.7 | 26.8 | 102 | 217 | 120 | 44 | 256 | 87 |
| 28 | 45 | M | 92.3 | 27.0 | 105 | 204 | 86 | 50 | 331 | 105 |
| Mean | | | 80.1 | 27.2 | 94.0 | 210.9 | 116.4 | 49.2 | 226.9 | 94.3 |
| SD | | | 7.53 | 1.34 | 7.80 | 18.56 | 22.71 | 7.16 | 47.50 | 8.22 |

AC = abdominal circumference;
SD = standard deviation

No significant reductions were observed, according to Student t-test for interdependent data, for any of the parameters under consideration.

As can be seen from the above results, collected for convenience in Table 9 below, all the food products tested (bread, pasta) according to the present invention have shown a surprisingly significant activity in reducing body weight, BMI, abdominal circumference, total and LDL cholesterol, plasma triglycerides, glycemia and in increasing HDL cholesterol, with respect to the corresponding ordinary food products.

TABLE 9

Mean values ± SD of analyzed parameters before and after treatment with Nopal-based food products compared with ordinary food products

| | tagliatelle with Nopal** | bread with Nopal | ordinary bread and pasta | Parameter |
|---|---|---|---|---|
| Before | 79.3 ± 8.99 | 80.6 ± 8.47 | 80.4 ± 7.22 | Weight in Kg |
| After | 77.17 ± 9.12* | 78.0 ± 8.35* | 80.1 ± 7.53 | |
| Before | 27.1 ± 1.10 | 27.4 ± 1.12 | 27.4 ± 1.31 | BMI |
| After | 26.4 ± 1.17* | 26.5 ± 1.12* | 27.2 ± 1.34 | |
| Before | 93.9 ± 8.21 | 94.6 ± 8.03 | 94.2 ± 8.20 | AC |
| After | 90.6 ± 7.99* | 90.3 ± 7.42 | 94.0 ± 7.80 | |
| Before | 202.8 ± 10.73 | 205.9 ± 11.58 | 209.4 ± 17.68 | Total cholesterol |
| After | 173.8 ± 13.21* | 167.1 ± 9.36* | 210.9 ± 18.56 | |
| Before | 114.5 ± 13.46 | 117.1 ± 10.82 | 114.7 ± 22.60 | LDL cholesterol |
| After | 88.9 ± 15.27* | 81.7 ± 13.69* | 116.4 ± 22.71 | |
| Before | 49.0 ± 5.54 | 49.8 ± 12.82 | 49.8 ± 8.83 | HDL cholesterol |
| After | 50.0 ± 6.77* | 53.7 ± 11.66* | 49.2 ± 7.16 | |
| Before | 196.3 ± 21.50 | 195.0 ± 19.48 | 221.7 ± 45.90 | Triglycerides |
| After | 174.4 ± 19.39* | 158.3 ± 20.37* | 226.9 ± 47.50 | |
| Before | 100.0 ± 8.10 | 95.8 ± 5.63 | 93.5 ± 7.72 | Glycemia |
| After | 95.2 ± 6.13* | 87.5 ± 5.95* | 94.3 ± 8.22 | |

*$p < 0.05$ t-test for interdependent data Before vs After
**An analysis of variance for orthogonal contrasts, carried out on the differences between before treatment and after, indicates that both the bread and pasta containing Nopal are significantly more effective than ordinary bread and pasta, but the data recorded for the group treated with bread is significantly higher ($p < 0.05$) than the tagliatelle data.

Without wishing to bound by any theory, it's supposed that a biological action, in particular hypolipemizing and antihyperlipemic activities, deriving from the combination of the components present in the Nopal extracts or powders, when used in composition with flour surprisingly allowed to achieve frequently consumed food products that are capable of limiting fat and cholesterol intake with respect to equal amount of known frequently consumed food products, without affecting the resulting palatability and without losing their beneficial properties during baking or boiling.

As a matter of fact, the food product preparation process according to the present invention is found to maintain Nopal activity despite the respective processes of oven baking and boiling. The greater activity observed, particularly for the inventive bread, can be ascribable both to the type of food and the higher dose administered with the bread (30 g in total with bread and 24 g in total with pasta), but in addition, also to a positive interaction between Nopal and other food components in the bread.

It is understood that the examples and embodiments described herein are for illustrative purposes only and that various modifications or changes in light thereof will be suggested to persons skilled in the art and are to be included within the spirit and purview of this application and scope of any appended claims. All figures, tables, and appendices, as well as publications, patents, and patent applications, cited herein are hereby incorporated by reference in their entirety for all purposes.

What is claimed is:

1. A method for reducing body weight, body mass index (BMI), abdominal circumference, total cholesterol, low density lipoprotein (LDL) cholesterol, plasma trigycerides and/or glycemia in a subject comprising the steps of:
   obtaining a food product comprising flour and a single pharmacologically active ingredient consisting of 0.5 wt % to 6 wt % of Opuntia ficus-indica (Nopal) on the basis of the flour weight; and
   administering said food product to the subject, in the absence of dietary modification by said subject in a daily amount containing 2 to 6 g of Nopal;
   wherein body weight, BMI, abdominal circumference, total cholesterol, LDL cholesterol, plasma trigycerides and/or glycemia in said subject is reduced.

2. The method of claim 1, wherein the food product is in the form of a bakery product or pasta.

3. The method of claim 1, wherein the food product comprises 1 wt % to 3 wt % of Nopal on the basis of the flour weight.

4. The method of claim 1, wherein in the food product comprises Nopal in the powdered form.

5. The method of claim 1, wherein the food product is selected from bakery products, bread and pasta.

* * * * *